United States Patent
Monte et al.

(10) Patent No.: US 8,179,832 B2
(45) Date of Patent: May 15, 2012

(54) SYSTEM AND METHOD FOR PROVIDING AN IMPROVED TERRESTRIAL SUBSYSTEM FOR USE IN MOBILE SATELLITE SYSTEMS

(75) Inventors: Paul A. Monte, San Jose, CA (US); Vijaya Gallagher, San Jose, CA (US)

(73) Assignee: Globalstar, Inc., Milpitas, CA (US)

( * ) Notice: Subject to any disclaimer, the term of this patent is extended or adjusted under 35 U.S.C. 154(b) by 1081 days.

(21) Appl. No.: 11/447,265

(22) Filed: Jun. 5, 2006

(65) Prior Publication Data

US 2007/0281611 A1    Dec. 6, 2007

(51) Int. Cl.
*H04B 7/185* (2006.01)
*H04L 5/04* (2006.01)

(52) U.S. Cl. ........................................ 370/316; 370/204

(58) Field of Classification Search .................. 370/316, 370/204, 319, 349, 318, 335; 455/13.4, 12.1, 455/307, 13.1, 13.2, 3.02, 427, 430; 342/359, 342/272; 343/713, 786; 244/30, 136
See application file for complete search history.

(56) References Cited

U.S. PATENT DOCUMENTS

| | | | |
|---|---|---|---|
| 5,303,286 A | 4/1994 | Wiedeman | |
| 5,490,087 A | 2/1996 | Redden et al. | |
| 5,715,297 A | 2/1998 | Wiedeman | |
| 5,903,837 A | 5/1999 | Wiedeman et al. | |
| 5,918,176 A | 6/1999 | Arrington, Jr. et al. | |
| 5,937,332 A | 8/1999 | Karabinis | |
| 6,052,586 A | 4/2000 | Karabinis | |
| 6,072,768 A | 6/2000 | Wiedeman et al. | |
| 6,856,787 B2 | 2/2005 | Karabinis | |
| 6,859,652 B2 | 2/2005 | Karabinis et al. | |
| 6,975,582 B1 * | 12/2005 | Karabinis et al. | 370/204 |
| 2002/0146979 A1 * | 10/2002 | Regulinski et al. | 455/13.1 |
| 2003/0203717 A1 * | 10/2003 | Chuprun et al. | 455/12.1 |
| 2003/0224724 A1 * | 12/2003 | Kato | 455/12.1 |
| 2004/0072539 A1 * | 4/2004 | Monte et al. | 455/13.4 |
| 2006/0181455 A1 * | 8/2006 | Hudson et al. | 342/359 |
| 2009/0156154 A1 * | 6/2009 | Karabinis et al. | 455/307 |

OTHER PUBLICATIONS

Issue in Satellite Personal Communication Systems, Lutz with a publish date of Feb. 1998, Wireless Networks, Springer Netherlands vol. 4 No. 2 pp. 109-124.*

* cited by examiner

*Primary Examiner* — Kiet Doan
(74) *Attorney, Agent, or Firm* — Perman & Green, LLP

(57) ABSTRACT

A system or method is disclosed which employs filters on a satellite whose bandwidth is varied by ground command to restrict interference experienced by a satellite as an auxiliary terrestrial component (ATC) system is increased to a multiplicity of cities and markets. Thus there is provided a novel method and system which optimizes overall MSS and ATC traffic.

19 Claims, 4 Drawing Sheets

SYSTEM AND METHOD FOR PROVIDING AN IMPROVED TERRESTRIAL SUBSYSTEM FOR USE IN MOBILE SATELLITE SYSTEMS

I. FIELD OF THE INVENTION

The present invention relates to satellite radio telephone systems and methods. More specifically, the present invention relates to mobile satellite systems employing an augmented terrestrial component.

II. BACKGROUND OF THE INVENTION

It is known that satellite radio telephones have been developed and deployed throughout the world, especially where topographical conditions preclude use of conventional mobile radio telephones or fixed wire telephones, for example in rugged terrain areas or sparsely populated areas. These systems typically are understood to provide both voice and data communications so that they may include terminals such as PCS terminals.

Prior art satellite radio telephone systems may be broadly classified into two types: mobile satellite radio telephone systems and fixed satellite radio telephone systems. In each of these systems one or more satellites are used to communicate with radio telephones, the satellites being either orbiting satellites or geostationary satellites. Typically, a mobile satellite radio telephone system is designed to communicate with a plurality of mobile radio telephones of similar size as conventional cellular radio telephones, whereas a fixed satellite radio telephone system is designed to communicate with a plurality of fixed or non-mobile radio telephones using large, permanent or semi-permanent fixed antennas which may be mounted on buildings or homes. The satellite signals to/from the fixed radio telephones are then usually further distributed to a large number of users via a terrestrial, wired network.

Consequently, it is found the capacity of fixed satellite radio telephone systems (as measured by total number of users served) is much larger than that associated with mobile satellite radio telephone systems where a significantly lower number of users is served than in a fixed satellite system.

Generally, the per-satellite capacity of a satellite radio telephone is limited by the amount of satellite power that is expended per communication circuit in order to establish and maintain communications with a radio telephone. In addition, limiting factors such as available frequency spectrum and the typically poor frequency reuse of satellite radio telephone systems impact the per-satellite capacity of these phones.

Consequently, mobile satellite radio telephone systems have been found to generally possess much lower capacity than fixed satellite radio telephone systems. Both regional and global mobile satellite systems are found to be quite limited in capacity, the regional mobile satellite systems involving geostationary satellites having, for example, a capacity per satellite of about 10,000 simultaneous voice circuits, whereas global mobile satellite systems involving both medium earth orbiting satellites, or MEOs, or low earth orbiting satellites, or LEOs, generally have even lower capacity per satellite ranging into the 3,000-4,000 simultaneous voice circuits.

It is understood that the per-satellite capacity of mobile satellite radio telephone systems is the amount of power that is expended per communication by the satellite payload in order to establish and maintain communications with the small hand held mobile phones. The practical limitations involved in forming a very large number of spot beams from the satellite often limits frequency reuse for mobile satellite radio telephone systems resulting in generally low capacities of said systems.

By contrast, fixed satellite radio telephone systems generally have higher capacity than mobile systems since they employ fixed user terminals which can use relatively large end user antennas. The satellite power required per equivalent communication is found to be lower for a fixed system than for a mobile system and, in addition, frequency allocations of the fixed systems are found to be more liberal than those of mobile systems due to inter alia fixed systems generally operate at higher frequencies such as C-band or above where the frequency spectrum is not as crowded and user terminals are fixed and use highly directional antennas so that angular separation between satellites can be relied upon for frequency reuse.

Prior art methods to increase the relatively limited capacity of mobile satellite radio telephone systems experiencing capacity bottlenecks or hot spots which are developed in congested areas of the mobile satellite radio telephone system where the mobile satellite radio telephone system (MSS) does not have enough capacity to accommodate all users, it is found difficult to increase the capacity of the MSS in these congested areas.

Consequently, methods and systems to increase the capacity of MSS include allowing an MSS to use some of the capacity of a fixed satellite system in areas of congestion, such as defined in U.S. Pat. No. 6,052,586.

In addition to improving cellular satellite communication systems and methods to provide wireless communications employing at least one space based component such as one or more satellites that are configured to wirelessly communicate with a plurality of radio telephones or other types of cellular terminals, hybrids of satellite and terrestrial systems have been developed and used wherein terrestrial networks enhance cellular satellite communications system availability, efficiency and/or economic viability by terrestrially reusing at least some of the frequency bands allocated to cellular satellite communication systems. Difficulty is experienced for cellular satellite communication systems to reliably serve densely populated areas where the satellite signal may be blocked by high rise structures or may not penetrate into buildings. In such cases, the satellite spectrum may be underutilized or unutilized in such areas. It is found that the use of terrestrial retransmission can reduce or eliminate this problem. Thus, the capacity of the overall system can be increased significantly by the introduction of terrestrial retransmission since terrestrial frequency reuse can be much denser than that of a satellite-only system. It is further found that capacity can be enhanced where it may be mostly needed, for example, densely populated urban/industrial/commercial areas so that the overall system can become much more economically viable as it is seen to be able to serve a much larger subscriber base.

One example in the prior art of terrestrial reuse of satellite frequencies is described in U.S. Pat. No. 5,937,332 entitled "Satellite Telecommunications Repeaters and Retransmission Methods". Generally described therein, satellite communication repeaters are provided which receive, amplify and locally retransmit the downlink signal received from a satellite, thereby increasing the effect of downlink margin in the vicinity of the satellite telecommunications repeaters and allowing an increase in the penetration of uplink and downlink signals into buildings, foliage, transportation vehicles and other objects which can reduce link and margin.

Methods and systems in the prior art allow a satellite radio telephone frequency to be reused terrestrially within the same satellite cell while allowing intrasystem interference to be reduced. These systems include a space based component such as a satellite that is configured to receive wireless communications from a first radio telephone in a satellite footprint comprising one or more cells over a satellite radio telephone frequency band. There is also provided an ancillary terrestrial network comprising one or more ancillary terrestrial components configured to receive wireless communications from a second radio telephone in the satellite footprint over the satellite radio telephone frequency band. The wireless communications from the second radio telephone are also received by the space based component in the satellite footprint over the satellite radio telephone frequency band as interference, along with the wireless communications that are received from the first radio telephone in the satellite footprint over the satellite radio telephone frequency band. In such cases, an interference reducer is employed that is responsive to the space based component and to the ancillary terrestrial network and that is configured to reduce the interference from the wireless communications that are received by the space based component from the first radio telephone in the satellite footprint over the satellite radio telephone frequency band using the wireless communications that are received by the ancillary terrestrial network from the second radio telephone in the satellite footprint over the satellite radio telephone frequency band.

Other wireless communications systems including a satellite gateway coupled to a communications network and operative to communicate with a communications satellite include a terrestrial terminal interface subsystem operative to communicate with a satellite gateway via the communications satellite using a first radio interface and to communicate with wireless terminals over a geographic area using a second radio interface, for example, as defined in U.S. Pat. No. 6,856,787.

Other cellular systems comprise a space based system including a first set of cells and a ground based system including a second set of cells. In such systems the space and ground systems can optionally function substantially autonomously with each using spectrum from at least one predetermined frequency band, for example, as described in U.S. Pat. No. 6,859,652.

Prior art mobile satellite systems employing radio telephones or MSS are known in the art; for example, in U.S. Pat. No. 5,303,286 to Globalstar® a satellite communication system having at least one, but usually a plurality, of orbiting satellites over a terrestrial satellite service area, a satellite control center and a plurality of terrestrial communication links wherein call setup is controlled by processors and databases onboard the orbiting satellites and where only after the satellite link for the communication channels is completed, does control and switching rely on ground based systems such that the orbiting satellites are integrated into a ground based telephone network and tariff structure.

In U.S. Pat. No. 5,715,297 to Globalstar® there is disclosed a radio communication system capable of servicing a roaming user or the like outside the range of terrestrial relay stations which includes a packet switched network and database of roaming users and a satellite communications system having at least one, but usually a plurality, of orbiting satellites over a terrestrial satellite service area, a satellite control center and a plurality of terrestrial communication links, wherein call setup is controlled by processors and databases onboard the orbiting satellites and wherein only after the satellite link for the communication channels is completed, does control and switching rely on ground based equipment such that the orbiting satellites are integrated to a ground based telephone network and tariff structures. Similar systems and improvements thereto, as found in the U.S. Pat. Nos. 5,303,286 and 5,715,297, include those defined in U.S. Pat. No. 5,903,837 and U.S. Pat. No. 6,072,768.

Various other systems have been proposed as depicted in the FCC filing for "Authority to Launch and Operate a Satellite System to Provide Mobile Satellite Services in the 2 GHz Bands" dated Nov. 3, 2000, relating to the Globalstar® system, which is hereby incorporated by reference; the FCC filing in the matter of Mobile Satellite Ventures Subsidiary, LLC for "Minor Amendment of Application to Launch and Operate a Replacement L Band Mobile Service Satellite at 101° West" dated Nov. 18, 2003; and the FCC filing by Thuraya which depicts a one GEO satellite system to provide a satellite telephone service; and the Iridium system produced by Motorola generally described in U.S. Pat. Nos. 5,918,176 and 5,490,087, in addition to the above recited Globalstar® systems.

In view of the above discussion, there continues to be a demonstrated need for systems and methods for terrestrial reuse of cellular satellite frequencies that can allow improved reliability, capacity, cost effectiveness and/or esthetic appeal for cellular satellite radio telephone systems, methods and/or satellite radio telephones.

III. OBJECTS OF THE INVENTION

It is therefore an object of this invention to provide a satellite terrestrial communication system and method of operation that facilitates effective spectrum assignment, usage sharing and/or reuse.

A further object of this invention is to provide a satellite terrestrial communication system and method of operation thereof that minimizes interference between the satellite and terrestrial systems.

Still another object of this invention is to provide a satellite terrestrial communication system and method of operation that enables at least a portion of the frequencies associated with an area of coverage to be utilized by a terrestrial system having overlapping coverage with a second area of coverage.

Again another object of this invention is to provide a satellite terrestrial communication system and method that enables a terrestrial underlay system associated with a first area of coverage to reuse and/or share in a substantially central portion thereof at least a portion of the frequency spectrum of one or more adjacent areas of coverage of the satellite system.

Yet again another object of this invention is to provide a two system communication system wherein frequencies associated with a first area of coverage for a first communication system are assigned, reused and/or shared in a second area of coverage associated with a second communication system.

Yet again another object of this invention is to enable assignment reuse and/or reassignment of satellite uplink and downlink channels in a non-paired manner.

Still a further object of this invention is to provide a satellite terrestrial communication system in which the satellite and terrestrial components operate independently of each other while sharing at least a portion and optionally all of a common frequency band.

Another object of this invention is to provide a satellite terrestrial communication system in which the satellite and terrestrial components operate independently of each other while utilizing discrete frequency bands.

Yet again another object of this invention is to provide a satellite terrestrial communication system and method of operation that minimizes interference between the satellite and terrestrial components.

IV. BRIEF SUMMARY OF THE INVENTION

These and other objects of the instant invention are accomplished, generally speaking, by providing a system and method which employs filters on a satellite whose bandwidth is varied by ground command to restrict interference experienced by a satellite system as an auxiliary terrestrial component (ATC) system is increased to a multiplicity of cities and markets. Consequently, it is found that ATC services are expanded in different cities in different frequency channels within each MSS providers authorized ATC band. While the number of ATC subscribers supported increases, the MSS capacity is found not to decrease correspondingly because of interference from the ATC subscribers into the satellites.

V. BRIEF DESCRIPTION OF THE DRAWINGS

The above set forth and other features of the invention are made more apparent in the ensuing Detailed Description of the Invention when read in conjunction with the attached drawings, wherein.

VI. DETAILED DESCRIPTION OF THE INVENTION

Figure 1:
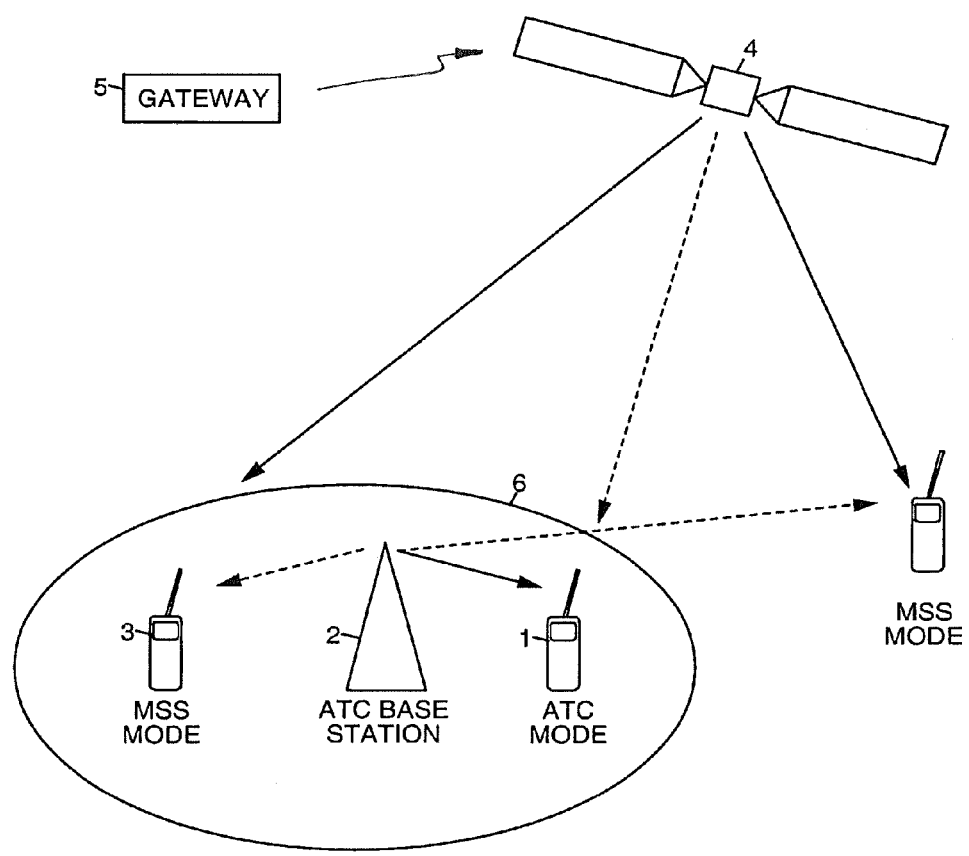
FIG. 1 illustrates an integrated MSS/ATC.

FIG. 1 shows an integrated MSS/ATC system conceptually. In this system, a user terminal can be operated in either ATC mode or MSS mode. In the figure, user terminal (1) is shown as operating in ATC mode; i.e., communicating to and from an ATC base station (2). User terminal (3) is shown as operating in MSS mode. In this mode, the user terminal transmits to and receives from a gateway (5) via satellite (4). Satellite (4) may be a GEO satellite or one of a constellation of GEO or MEO or LEO satellites. The ATC base station potentially interferes with the MSS downlink/uplink inside the ATC coverage area (6).

Figure 2:
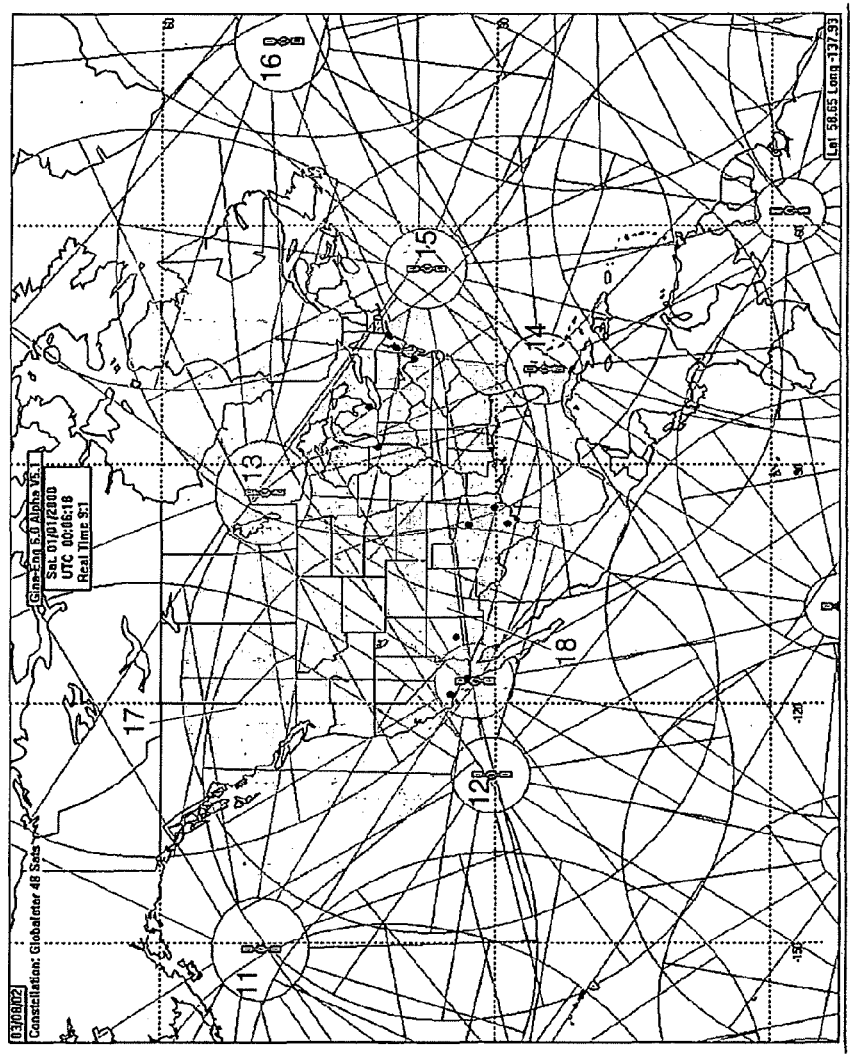
FIG. 2 illustrates an MSS/ATC system in a LEO constellation.

FIG. 2 shows an example of an MSS/ATC system that uses a LEO constellation of satellites, some of which are shown as (11), (12), (13), (14), (15), (16). In this figure, darker shaded zones (e.g., zone 17) show normal full-spectrum MSS beams that are using all the MSS frequency channels available. The lighter shaded zones (e.g., zone 18) show regions where worst case ATC frequency interference causes impaired MSS service in frequencies used for ATC.

Figure 3:
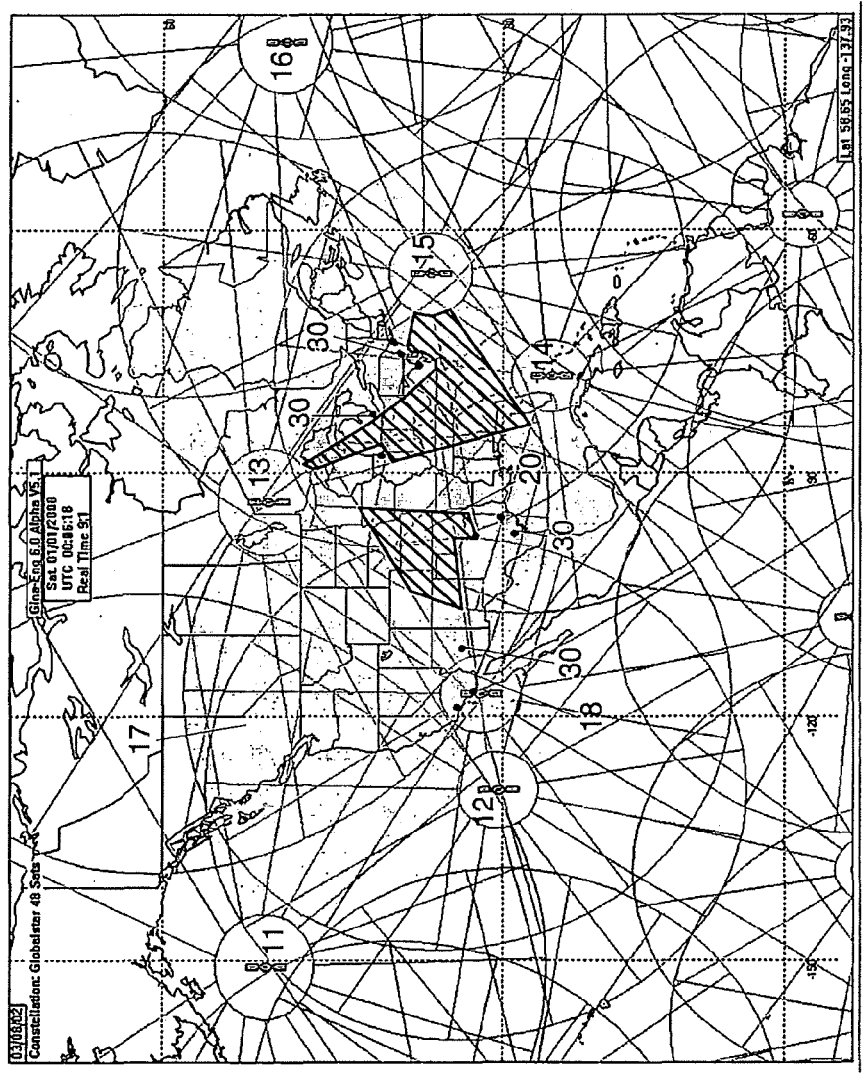
FIG. 3 illustrates two separate ATC frequencies.

FIG. 3 shows the same regions, but now with an improvement in MSS area by assigning two separate frequencies dynamically to MSS and ATC segments. In this figure, zones 20 use selected MSS frequencies via selected satellites. Separate ATC frequencies are designated by dotted zones 30.

Figure 4:
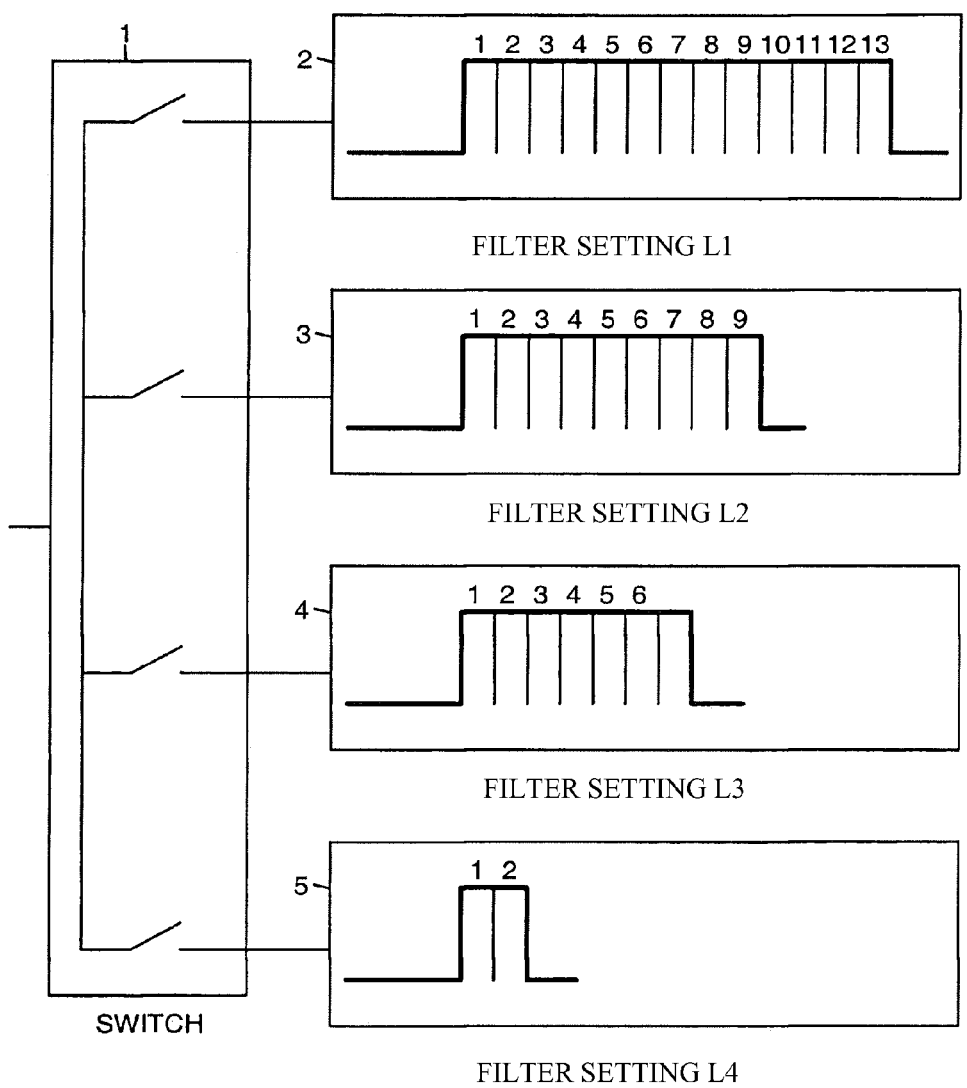
FIG. 4 illustrates a simplified block diagram of filter settings on each satellite in the constellation.

FIG. 4 shows an example of a simplified block diagram of the filter settings on each satellite in the constellation. In the example shown, there are four filter settings designated L1, L2, L3, L4. Setting L1 allows 13 channels of MSS services to be served by the satellite; L2 allows 9 channels of MSS; L3 allows 6 channels; and L4 allows 2 channels. Any number of filter settings may be implemented, although only four are shown.

Overall MSS and ATC capacity is optimized by switching in a filter setting corresponding to the relative MSS and ATC traffic anticipated. This may be done dynamically, on a beam-by-beam and satellite-by-satellite basis, or on a predetermined basis based on time of day and traffic projections, or using any other method of determining how many channels are needed for MSS versus ATC. Thus in filter setting L4, only 2 MSS channels are sufficient for MSS traffic. In this setting, any amount of ATC traffic can be put into the remaining 11 channels of the 13 possible without affecting the MSS traffic in that beam. However, practical limitations arise from adjacent beam interference, but even then, actual ATC capacity per beam is significantly enhanced over the case where there is no such filter setting.

For example, it is currently found that the Globalstar® satellite system as above defined can support 5.88 million ATC subscribers per 1.23 MHz channel while still maintaining excellent MSS capacity to serve rural areas. This provides a total ATC subscriber base of 23.5 million ATC subscribers in 5.5 MHz ATC spectrum over the continental United States (CONUS). Globalstar® may further increase ATC capacity by making use of the narrowest L band filters available on the Globalstar® satellite constellation to result in about 411 million subscribers for ATC services in CONUS while still serving 107,000 MSS subscribers in CONUS.

It is found that employing the system and method of the instant invention that S band use of ATC does not noticeably impact satellite capacity since forward link capacity is determined by total satellite power and there are, for example, 13 channels available on the currently employed Globalstar® system available on the forward link and up to seven channels contemplated for ATC use. Consequently, it is found that MSS capacity limitations due to the employment of ATC become noticeable with the interference limited to L band on the return link.

Accordingly, the discussion hereinafter will be directed to the return link wherein the ATC capacity available is calculated employing the steps which are discussed hereinafter.

A first determination is made to assess the interference an average ATC terminal contributes towards co-channel MSS users by evaluating the various factors that diminish the impact of an ATC terminal's interference into the satellite's L band antenna. These factors include the difference in propagation loss towards the satellite and base station, differences in antenna gain in the two directions, and polarization losses, as well as the reduced power expected on average for ATC transmissions. Under these circumstances, a loss of about 26.9 dB or a factor of 490 when considering the impact of an ATC subscriber as opposed to an MSS subscriber or, in other words, 490 ATC subscribers are equivalent to one MSS subscriber co-channel in the same beam. Each 1.23 MHz channel is found to carry 60 simultaneous MSS users per beam, which translates to about 60×490 or about 29,400 simultaneous ATC users per beam or about 176,400 simultaneous ATC users over six beams covering CONUS before it exhausts the MSS channel. When considering the standard traffic intensity of 30 milli-Erlangs for cellular use, the total number of ATC subscribers in CONUS is about 5.88 million per 1.23 MHz channel. It is contemplated that many more subscribers can be accommodated without affecting the same beam; however, as more ATC subscribers are added beyond the number that causes interference equal to the MSS capacity of that channel, the ATC interference starts affecting adjacent beams as well. For example, if each beam is attenuated on average by 6 dB, or a factor of 4, in the region of overlapping beams, then if there were 5.88×4 million ATC subscribers in one channel in one beam, then that would effectively be depriving the adjacent beam of MSS use of that channel.

Employing the assumption that there are 50 major trade areas (MTAs) in CONUS and that ATC is rolled out progressively across these MTAs, on average, if only 10 MTAs have ATC rolled out, then the capacity impact on each beam is about ⅕ the effect it would have if all 50 MTAs were rolled out. Of course, the specifics of the MTA locations would affect the actual result; nevertheless, this approximation is substantially correct to calculate the loss of MSS capacity as ATC is rolled out.

In the instance where Globalstar® is authorized ATC in all nine L band channels, it would be possible to do a band segmentation and allocate separate MSS and ATC channels by employing the L band surface acoustic wave (SAW) filter settings available on each Globalstar® satellite. Globalstar® satellites, as originally built and employed, included these filters by virtue of the uncertainty at the time of designing the satellites as to which channels would be allocated to Globalstar® and which, for example, to Iridium and they comprise four settings: L1 (all 13 channels), L2 (9 channels), L3 (6 channels), and L4 (2 channels) as shown conceptually in FIG. 4, where switch (1) can be commanded to select either filter (2) or (3) or (4) or (5). A satellite operating in L3 mode would pass only 6 channels of MSS and leave the other 3 channels for ATC exclusively. The approximate filter attenuation of adjacent channels is at least a factor of 10. In this scenario, it is possible to go to at least 10×5.88 million subscribers in each of the 3 ATC channels without affecting the same beams (since the ATC interference would be filtered out). Surpassing this number of subscribers, the ATC channels could start affecting adjacent beams of other satellites that are in L2 mode. However, this would result in an ATC capacity of 176 million (=10×5.88×3) subscribers and an MSS capacity of 322,000 subscribers in CONUS.

In the case where MSS were restricted to only 2 channels available in L4 mode, then ATC subscribers in the other 7 channels could be increased to 10×5.88 million per channel before impacting adjacent beams of other satellites that overlap the area and are in L2 mode. This would result in about 411 million ATC subscribers and about 107,000 MSS subscribers in CONUS.

Any suitable method of assigning a first frequency (F1) to the ATC component may be employed in the system of the instant invention. Typical methods of assigning a first frequency include random assignment, or use of an algorithm that determines which frequency is least occupied by desired users and/or interference.

Any suitable method of dynamically setting a filter on the satellite to suppress F1 frequency may be employed in the system of the instant invention. Typical methods for setting filters include switching in a filter based on a command transmitted from the ground, or on a predetermined time schedule.

Any suitable method of allocating frequencies other than F1 to the MSS component may be employed in the system of the instant invention. Typical methods of allocating include random assignment, or use of an algorithm for selecting frequencies sequentially based on a determination of which ones have least interference.

Although the method and system of the instant invention has been illustrated by employing a LEO constellation comprising at least one satellite in LEO orbit, the method and system of the invention may also be practiced employing medium earth orbiting (MEO) satellites comprising at least one satellite in MEO orbit, geosynchronous earth orbiting (GEO) satellites comprising at least one satellite in GEO orbit, and highly elliptical earth orbiting (HEO) satellites comprising at least one satellite in HEO orbit.

What is claimed is:

1. A method for maximizing auxiliary terrestrial component (ATC) and mobile satellite radio telephone system (MSS) capacity in a combination ATC/MSS system where the ATC coverage area overlaps the MSS coverage area comprising:
   assigning a first frequency (F1) to the auxiliary terrestrial component (ATC) component;
   dynamically setting a filter on the satellite to suppress first frequency (F1) by switching in the filter based on a command transmitted from a ground location; and
   allocating frequencies other than first frequency (F1) to the mobile satellite radio telephone system (MSS) component,
   wherein said dynamically setting a filter on the satellite to suppress first frequency (F1) comprises switching in a filter based on a predetermined time schedule.

2. The method as defined in claim 1 wherein the ATC and MSS capacity is provided by a LEO constellation comprising at least one satellite.

3. The method as defined in claim 1 wherein the ATC and MSS capacity is provided by a MEO constellation comprising at least one satellite.

4. The method as defined in claim 1 wherein the ATC and MSS capacity is provided by a GEO constellation comprising at least one satellite.

5. The satellite method as defined in claim 1 wherein the ATC and MSS capacity is provided by an HEO constellation comprising at least one satellite.

6. The method as defined in claim 1 wherein the ATC and MSS capacity is provided by a combination of LEO, MEO, GEO and HEO satellites.

7. The method as defined in claim 1 wherein said allocating frequencies comprises employing random assignment of said frequencies.

8. The method as defined in claim 1 wherein said allocating frequencies comprises employing an algorithm.

9. The method as defined in claim 8 wherein said algorithm is employed to select frequencies sequentially based on a determination of which frequencies have least interference.

10. The method as defined in claim 1 wherein said allocating frequencies comprises determining which frequency is least occupied by desired users.

11. A system for maximizing auxiliary terrestrial component (ATC) and mobile satellite radio telephone system (MSS) capacity in a combination ATC/MSS system wherein the ATC coverage area overlaps the MSS coverage area comprising:
    means for assigning a first frequency (F1) to the mobile satellite radio telephone system (MSS) component;
    means for dynamically setting a filter on a satellite to suppress first frequency (F1) by switching in the filter based on a command transmitted from a ground location; and
    means for allocating frequencies other than first frequency (F1) to the mobile satellite radio telephone system (MSS) component,
    wherein said dynamic setting of filters comprises switching in on a predetermined time schedule.

12. The system as defined in claim 11 wherein said system employs a LEO constellation comprising at least one satellite.

13. The system as defined in claim 11 wherein said system employs a MEO constellation comprising at least one satellite.

14. The system as defined in claim 11 wherein said system employs a GEO constellation comprising at least one satellite.

15. The system as defined in claim 11 wherein said system employs an HEO constellation comprising at least one satellite.

16. The system as defined in claim 11 wherein said system employs a constellation that is a combination of LEO, MEO, GEO and HEO satellites each comprising at least one satellite.

17. The system as defined in claim 11 wherein said allocating comprises employing an algorithm for selecting frequencies sequentially.

18. The system as defined in claim 17 wherein said algorithm for selecting frequencies sequentially is based on a determination of which frequencies have least interference.

19. The system as defined in claim 11 wherein assigning the frequency comprises random assignment.

* * * * *